United States Patent
Mori (10) Patent No.: US 7,149,009 B2
(45) Date of Patent: Dec. 12, 2006

(54) SCANNING OPTICAL APPARATUS, IMAGE FORMING APPARATUS, AND ADJUSTING METHOD THEREFOR

(75) Inventor: Seiichiro Mori, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1121 days.

(21) Appl. No.: 10/137,348

(22) Filed: May 3, 2002

(65) Prior Publication Data

US 2003/0025783 A1   Feb. 6, 2003

(30) Foreign Application Priority Data

Jul. 31, 2001  (JP)  .............................. 2001-231242

(51) Int. Cl.
*H04N 1/04* (2006.01)

(52) U.S. Cl. ...................... 358/484; 358/481; 358/474; 359/205; 250/280.2; 250/235

(58) Field of Classification Search ................ 358/520, 358/514, 484, 481, 474; 359/205; 347/241, 347/256; 250/280.2, 235
See application file for complete search history.

(56) References Cited

U.S. PATENT DOCUMENTS

| 5,774,248 A |   | 6/1998 | Komatsu ..................... 359/204 |
| 6,400,390 B1 | * | 6/2002 | Umeda et al. .............. 347/241 |
| 6,927,883 B1 | * | 8/2005 | Fujimoto .................... 358/484 |

FOREIGN PATENT DOCUMENTS

EP         1 085 743 A1    3/2001

* cited by examiner

*Primary Examiner*—Thomas D. Lee
*Assistant Examiner*—Heather D. Gibbs
(74) *Attorney, Agent, or Firm*—Fitzpatrick, Cella, Harper & Scinto

(57) ABSTRACT

In the scanning optical apparatus, a light source including one or more of the plurality of light emitting points of the light source device, and a synchronism detecting device constituting the synchronism detecting device are provided on one and the same substrate, the substrate is designed to be rotatable in a plane perpendicular to the direction of an optical axis of the incidence optical device, an optical element constituting the synchronism detecting device is disposed on a light incidence side of the synchronism detecting device, and the optical element is designed to be rotated in synchronism with the substrate when the substrate is rotated.

17 Claims, 7 Drawing Sheets

SCANNING OPTICAL APPARATUS, IMAGE FORMING APPARATUS, AND ADJUSTING METHOD THEREFOR

BACKGROUND OF THE INVENTION

1. Field of the Invention

This invention relates to a scanning optical apparatus and an image forming apparatus using the same, and particularly is suitable for an image forming apparatus such as a laser beam printer or a digital copying machine adapted to effect image formation by the use of a multi-semiconductor laser having a plurality of light emitting points as light source means to achieve a high speed and high recording density.

2. Description of Related Art

Figure 6:
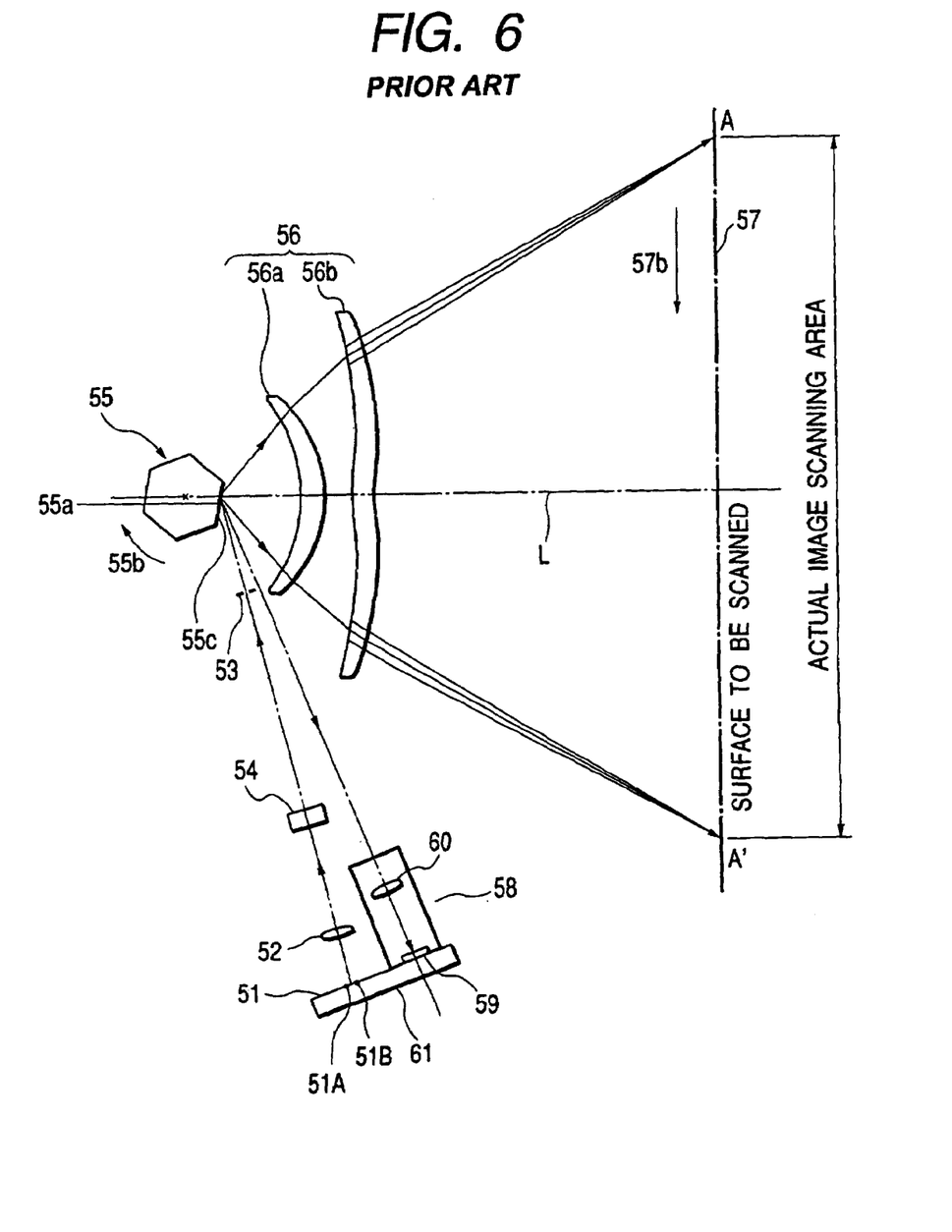
FIG. 6 is a main scanning cross-sectional view of a conventional scanning optical apparatus.

FIG. 6 of the accompanying drawings is a cross-sectional view of the essential portions in the main scanning direction (main scanning cross-sectional view) of a conventional multi-beam scanning optical apparatus using light source means having a plurality of light emitting points.

In FIG. 6, two beams (light beams) emitted from a multi-semiconductor laser 51 having two light emitting points 51A and 51B are converted into substantially parallel beams by a collimator lens 52, and the substantially parallel beam is converged only in a sub scanning direction by a cylindrical lens 54 having predetermined refractive power only in the sub scanning direction.

Further, the difference in aberration occurring from the difference between the beams tracing from the two light emitting points 51A and 51B separate from an optical axis affects the imaging performance and therefore, by an aperture stop 53 for reducing the influence thereof to the utmost, the beams are shaped and imaged into the shape of a focal line extending long in the main scanning direction near the deflecting surface (reflecting surface) 55c of a polygon mirror 55 which is a light deflector.

The two beams reflected and deflected by the polygon mirror 55 being rotated at a constant angular speed in the direction of arrow 55b are condensed into spot shapes on a photosensitive drum surface 57 as a surface to be scanned by two fθ lenses 56a and 56b as a scanning lens system 56, and are scanned at a constant speed in the direction of arrow 57b (the main scanning direction).

Figures 7, 8:
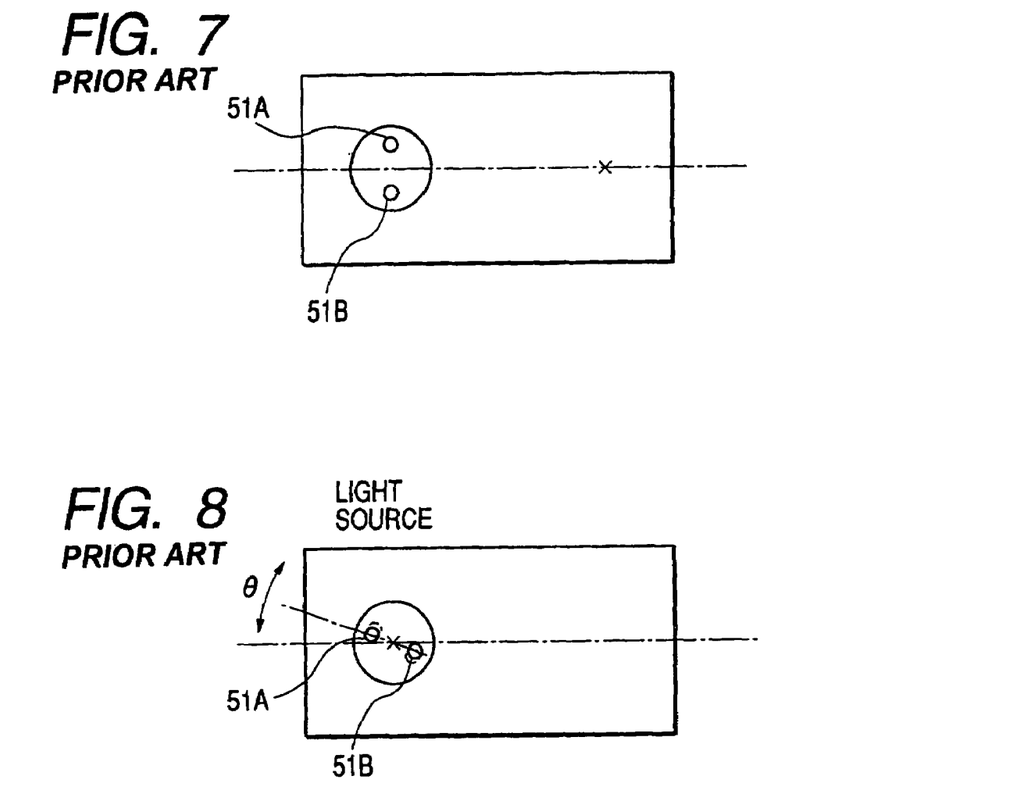
FIG. 7 is an illustration showing the positional relation between a plurality of light emitting portions.
FIG. 8 is an illustration showing the positional relation between a plurality of light emitting portions.

In such a multi-beam scanning optical apparatus, if as shown in FIG. 7 of the accompanying drawings, the two light emitting points 51A and 51B are arranged rectilinearly in the sub scanning direction, the interval between the two scanning lines in the sub scanning direction on the photosensitive drum surface becomes greater than recording density and therefore, usually as shown in FIG. 8, the two light emitting elements 51A and 51B are disposed obliquely with respect to a direction corresponding to the sub scanning direction, and by adjusting the angle of inclination θ thereof, the interval between a plurality of scanning lines in the sub scanning direction on the photosensitive drum surface is accurately adjusted in accordance with the recording density.

By doing this, it becomes possible to make the paths of the light beams coincident with each other to the utmost to thereby achieve higher recording density, and further the number of revolutions of a driving motor for the polygon mirror can be suppressed to ½ as compared with a case where the number of light emitting points is one, and it becomes possible to cope with a higher speed with a sufficient surplus.

Now, to effect scanning of high density at a high speed, it is likewise necessary to cope with the control of the time when image information starts to be written.

In FIG. 6, there is provided synchronism detecting means (BD optical system) 58 for controlling the timing of a scanning start position on the surface to be scanned, and there are disposed a synchronism detecting device (BD sensor) 59 for detecting a synchronizing signal (BD signal) and a synchronism detecting optical system (BD lens) 60 for directing a synchronism detecting beam (BD beam) to the synchronism detecting device 59.

The beam converged only in the sub scanning direction by the cylindrical lens 54 as previously described is made into a linear beam extending in the main scanning direction near a deflecting surface 58c, and enters the synchronism detecting optical system 60 as a substantially parallel beam in the main scanning cross section and as a divergent beam in the sub scanning cross section.

The synchronism detecting optical system 60 has independent focal lengths in the main scanning cross section and the sub scanning cross section, respectively, and is given power suited to be condensed on the synchronism detecting device 59 in the main scanning cross section and the sub scanning cross section, respectively, and the beam forms a spot on the surface of the synchronism detecting device 59.

In a single beam scanning optical apparatus, contrivance is done to make a semiconductor laser as a light source which is an electrical part and a synchronism detecting device integral with each other, and dispose the light source and the synchronism detecting device on one and the same substrate for the curtailment of the number of parts and cost, while in the case of a multi-beam scanning optical apparatus, writing is effected at a time at intervals in the sub scanning direction by a plurality of light sources and therefore, as means for adjusting the intervals, a composite optical system comprising a prism, a mirror, etc. disposed on the light emitting side near the light sources is adjusted. Also, in the case of a so-called monolithic multi-beam scanning optical apparatus having a light source having a plurality of light emitting points, the adjustment for accurately adjusting the pitch interval on a surface to be scanned in the sub scanning direction as by rotating the light source and a circuit substrate on which the light source is disposed is necessary.

Figure 9:
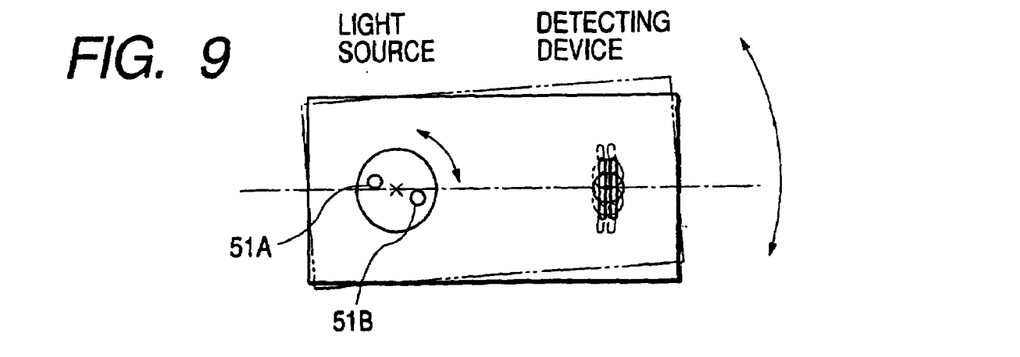
FIG. 9 is an illustration showing the positional relation between light source means and a synchronism detecting device.

Therefore, if the synchronism detecting device remains disposed on the same substrate as the light source, the synchronism detecting device will be moved with the rotation of the light source. When such structure as shown, for example, in FIG. 9 of the accompanying drawings wherein the form in the case of a single beam is intactly utilized and is rotated about a light source is adopted, in this structure, the light condensing point may deviate from the synchronism detecting device during the rotation, and this lead to the problem that even if the synchronism detecting device is rotated, a sufficient movement range cannot be secured, and when the light condensing point deviates, the work of shifting the location itself of the synchronism detecting device or the light source as by bending the synchronism detecting device or the leg of the light source becomes necessary and it is difficult to effect synchronism detection accurately.

Therefore, the light source and the synchronism detecting device are disposed on discrete substrates and adjustment thereof is effected discretely to thereby cope with this problem, but this leads to a factor for an increased cost because of an increase in the number of parts and the complication of an electric circuit caused by the plurality of substrates, and an increase in the work of arranging the wiring, and improvements have been desired.

SUMMARY OF THE INVENTION

It is an object of the present invention to provide a scanning optical apparatus in which a light source and a synchronism detecting device are disposed on the same substrate and yet the optical positional relation therebetween is kept good to thereby make the higher accuracy of writing timing possible, and an image forming apparatus using the same.

It is also an object of the present invention to simplify a positioning method and curtail the number of parts and shorten the working time necessary for adjustment to thereby curtail costs.

A further object of the present invention is to provide a scanning optical apparatus comprising: light source means, having a plurality of light emitting points, for emitting a plurality of beams; deflecting means for deflecting the plurality of beams; incidence optical means through which the plurality of beams emitted from the light source means are directed to the deflecting means; scanning optical means for directing the plurality of beams deflected by the deflecting means onto a surface to be scanned; synchronism detecting means for detecting a part of the plurality of beams incident on the surface to be scanned; wherein a timing of a scanning starting position of the plurality beams incident on the surface to be scanned is adjusted by using a synchronizing signal obtained by the synchronism detecting means, wherein a light source including one or more of the plurality of light emitting points of the light source means, and the synchronism detecting means comprising a synchronism detecting device are provided on the same substrate, wherein the synchronism detecting means further comprises an optical element disposed on a light incidence side of the synchronism detecting device, and wherein the optical element rotates in synchronism with the substrate when the substrate is rotated.

In the present invention, it is preferable that a slit 13 for limiting the incident beams is disposed on a light incidence side of the synchronism detecting device 9, an optical element 12 constituting the synchronism detecting means 8 is disposed on the light incidence side of the synchronism detecting device, and when a focal length of the optical element in a sub scanning direction is defined as f, and a distance from the slit tot he synchronism detecting device is defined as W, and an effective diameter of the optical element is define as D, and a distance on the substrate 11 from a center of rotation of the substrate to the synchronism detecting device is defined as d, and a composite magnification of the beams emitted from the light source means 1 in the sub scanning direction until the beams arrive at the synchronism detecting device is defined as m, and an angle of rotation when the substrate is rotated in a surface perpendicular to an optical axis direction of the incidence optical means is defined as θ, one or more of conditions that $0.6f<W<0.9f$ $2d\cdot\tan\theta(1-m)<D$ are satisfied.

In the present invention, it is preferable that the plurality of beams incident on the optical element 12 are substantially parallel beams in a sub scanning cross section.

In the present invention, it is preferable that the substrate is designed to be rotatable about a centroidal position of the light emitting points of the light source or the vicinity thereof.

In the present invention, it is preferable that a synchronism detecting optical system for directing part of the plurality of beams incident on the surface to be scanned causes the beams deflected by the deflecting means to be condensed on the slit in the main scanning cross section, and makes them into substantially parallel beams in the sub scanning cross section.

In the present invention, it is preferable that a synchronism detecting optical system for directing part of the plurality of beams incident on the surface to be scanned causes the beams deflected by the deflecting means to be condensed on the slit in a main scanning cross section and in a sub scanning cross section.

In the present invention, it is preferable that the optical element is fixed to a portion of a housing constructed integrally with the substrate.

In the present invention, it is preferable that the optical element has independent focal lengths in a main scanning cross section and in a sub scanning cross section, respectively, and condensed positions of the beams passed through the optical element do not coincide with each other in the main scanning cross section and in the sub scanning cross section.

In the present invention, it is preferable that the optical element has independent focal lengths in a main scanning cross section and in a sub scanning cross section, respectively, and include one or more diffracting surfaces.

In the present invention, it is preferable that the optical element has independent focal lengths in a main scanning cross section and in a sub scanning cross section, respectively, and has one or more aspherical surfaces having different curvatures in the main scanning cross section and in the sub scanning cross section.

In the present invention, it is preferable that the optical element includes a refractive index distribution type optical material in which incidence and emergence surfaces form flat surfaces.

In the present invention, it is preferable that the optical element has a surface having condensing or diverging performance, and a flat surface inclined with a main scanning direction as an axis.

In the present invention, it is preferable that the slit is disposed at or near condensed positions of the beams passed through a synchronism detecting optical system in a main scanning cross section, the slit includes a rectangular slit which is an opening long in a sub scanning direction, and the slit is designed to rotate in synchronism with the substrate when the substrate is rotated.

A further object of the present invention is to provide an image forming apparatus comprising such scanning optical apparatus as described above, a photosensitive body disposed on the surface to be scanned, a developing device for developing an electrostatic latent image formed on the photosensitive body by the light beams scanned by the scanning optical apparatus as a toner image, a transferring device for transferring the developed toner image to a transferring material, and a fixing device for fixing the transferred toner image on a transferring material.

Another object of the present invention is to provide an image forming apparatus comprising such scanning optical apparatus as described above, and a printer controller for converting code data inputted thereto from an external device into an image signal, and inputting the image signal to the scanning optical apparatus.

A still further object of the present invention is to provide an adjusting method of a scanning optical apparatus, comprising steps of: directing a plurality of beams emitted from light source means having a plurality of light emitting points to deflecting means through incidence optical means; directing the plurality of beams deflected by the deflecting means onto a surface to be scanned by scanning optical means; and adjusting a timing of a scanning starting position of the plurality of beams incident onto the surface to be scanned by using a synchronized signal obtained by synchronism detecting means for detecting a part of the plurality of beams incident onto the surface to be scanned. One or more of the plurality of light emitting points of the light source means, and a synchronism detecting device comprised by the synchronism detecting means are provided on the same substrate, and an optical element also comprised by the synchronism detecting means and rotating in synchronism with the substrate is provided on a light incidence side of the synchronism detecting device. A scanning interval of the plurality of beams, incident on the surface to be scanned, in a sub-scanning direction is adjusted by rotating the substrate in a surface perpendicular to an optical axis direction of the incidence optical means.

DESCRIPTION OF THE PREFERRED EMBODIMENTS (Embodiment 1)

Figure 1:
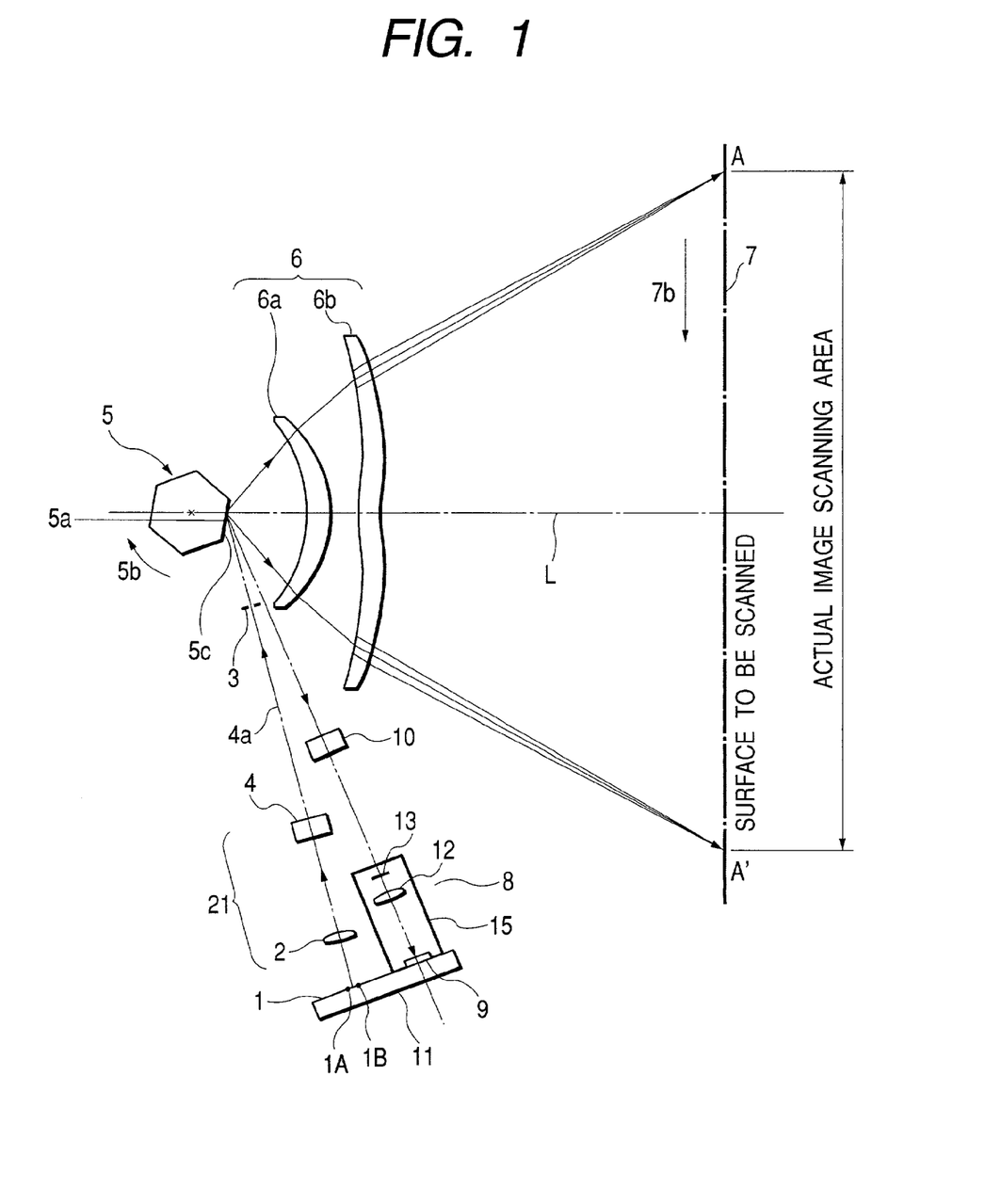
FIG. 1 is a main scanning cross-sectional view of Embodiment 1 of the present invention.

FIG. 1 is a cross-sectional view of the essential portions of Embodiment 1 of the present invention in the main scanning direction (main scanning cross-sectional view).

Herein, the direction in which a beam (light beam) is reflected and deflected (deflected and scanned) by deflecting means is defined as the main scanning direction, and a direction orthogonal to the optical axis of scanning optical means and the main scanning direction is defined as the sub scanning direction.

In FIG. 1, the reference numeral 1 designates light source means comprising a multi-semiconductor laser (light source) having two light emitting points 1A and 1B. The two light emitting points 1A and 1B are disposed separately with respect to the main scanning direction and the sub scanning direction.

The reference numeral 2 denotes a collimator lens which regulates beams emitted from the light source means 1 into a desired angle of expanse. The beams regulated by the collimator lens 2 can assume the form of convergent beams, divergent beams or substantially parallel beams as required, but herein, for the simplicity of description, they are substantially parallel beams.

The reference numeral 4 designates a cylindrical lens having predetermined refractive power only in the sub scanning direction, and it converges the substantially parallel beams regulated by the collimator lens 2 in the sub scanning direction near the deflecting surface 5c of a polygon mirror 5 which will be described later (linear images long in the main scanning direction). The converging points of the beams emitted from the light emitting point 1A and light emitting point 1B of the light source means 1 near the deflecting surface 5c are imaged with a slight interval therebetween in the sub scanning direction. This is because as is already known, the multi-semiconductor laser 1 which is the light source is rotated about the optical axis and is disposed at an interval considered with the sub scanning magnification of an fθ lens system 6 so that the two beams may be imaged on a surface 7 to be scanned with a scanning interval therebetween in the sub scanning direction.

Each of the collimator lens 2, the cylindrical lens 4, etc. constitutes an element of incidence optical means 21.

The reference numeral 3 denotes an aperture stop which shapes the two beams emerging from the cylindrical lens 4 into a desired optimum beam shape. The aperture stop 3 in the present embodiment is disposed at a place near the polygon mirror 5, namely, immediately before the incidence onto the deflecting surface 5c, whereby the incoincidence between the beams on the deflecting surface 5c is reduced so that a difference may not be created in the degree of occurrence of aberrations between scanning lines.

The reference numeral 5 designates a light deflector as deflecting means comprising, for example, a rotary polygon mirror, and rotated at a constant speed in the direction of arrow 5b by driving means (not shown) such as a motor.

The reference numeral 6 denotes scanning optical means (fθ lens system) having the condensing function and the fθ characteristic, and having first and second scanning lenses (fθ lenses) 6a and 6b, and these two scanning lenses 6a and 6b are formed into shapes differing in the main scanning cross section in the same plane as the scanning lines and the sub scanning cross section in a direction perpendicular thereto.

As regards the fθ lens system 6, both of the first and second fθ lenses 6a and 6b are formed by aspherical surfaces so that in the main scanning cross section, good imaging performance may be obtained at an image height corresponding to the angle of incidence θ onto the fθ lens system 6 formed by the rotation of the polygon mirror 5. Also, in the sub scanning cross section, power is distributed so that the beams once converged near the deflecting surface 5c of the polygon mirror 5 may be formed as spots on the surface 7 to be scanned as shown in FIG. 1, and the shape of the second fθ lens 6b is such that the curvature thereof differs along the main scanning direction, and the imaging performance is maintained up to the periphery of the angle of field.

Also, as required, at least one of the first and second fθ lenses 6a and 6b may be made eccentric from the optical axis L as by being shifted or tilted, or the fθ lens system 6 itself may be made asymmetrical in a direction along the main scanning direction so that imaging performance can be obtained corresponding to the endmost angles of view differing on the opposite sides in the main scanning direction.

Also, the fθ lens system 6 causes the two beams deflected by the polygon mirror 5 to be imaged into spot-like shapes on a photosensitive drum surface 7, whereby forming two scanning lines. Further, the fθ lens system 6 has the inclination correcting function by making the vicinity of the deflecting surface 5a of the polygon mirror 5 and the vicinity of the photosensitive drum surface 7 conjugate with each other in the sub scanning cross section.

The photosensitive drum surface 7 as a surface to be scanned is disposed while being shifted from the optical axis L of the fθ lens system 6 so that the beams may be incident in the sub scanning direction at an angle α with respect to the optical axis L. This is for preventing, even when there is created return light from the photosensitive drum surface 7, such return light from following its original optical path and returning to the light source 1.

The reference numeral 10 designates a synchronism detecting optical system (BD lens) which causes the beams deflected by the polygon mirror 5 to be condensed in the main scanning cross section relative to a slit 13 which will be described later and to become substantially parallel beams in the sub scanning cross section. That is, the synchronism detecting optical system 10, in the main scanning cross section, scans on the surface of the slit 13 which will be described later, and in the sub scanning cross section, makes the deflecting surface 5c of the polygon mirror 5 and the surface of the slit 13 substantially conjugate with each other, whereby it has the polygon mirror surface inclination correcting function (surface inclination correcting system). Also, the synchronism detecting optical system 10 comprises a structure independent of a substrate 11.

The reference numeral 8 denotes synchronism detecting means having a slit (BD slit) 13 for limiting the incident beam, a synchronism detecting optical element (synchronism detecting lens) 12 and a synchronism detecting device (BD sensor) 9, and it adjusts the timing of the scanning start position of image recording onto the photosensitive drum surface 7 by the use of a synchronizing signal (BD signal) obtained by being detected by the synchronism detecting device 9.

The slit 13 is disposed at or near the condensing positions of the beams passed through the synchronism detecting optical system 10 in the main scanning cross section, and comprises a rectangular slit which is an opening long in the sub scanning direction, and is of a construction in which when the substrate 11 is rotated as will be described later, the slit 13 is rotated in synchronism therewith.

In the present embodiment, the rotation of this slit 13 is synchronized with the rotation of the substrate 11, whereby synchronism detection (BD detection) of higher accuracy is effected.

A synchronism detecting optical element 12 has independent focal lengths in the main scanning cross section and in the sub scanning cross section, respectively, and is formed so that the condensing positions of the beams passed through this optical element 12 may not coincide with each other in the main scanning cross section and in the sub scanning cross section. That is, the optical element 12 differs in the power in the main scanning cross section and the power in the sub scanning cross section.

In the present embodiment, the light source 1 and the synchronism detecting device 9 are disposed on one and the same substrate 11. The substrate 11 is designed to be rotatable about the centroidal position of the light emitting point of the light source 1 (here, the centroidal position refers to a position at a half of the distance from one end to the other end of the light emitting point) or the vicinity thereof in a plane perpendicular to the direction of the optical axis 4a of incidence optical means 21, and the beams incident on the synchronism detecting device 9 are adapted to assume a shape long in the sub scanning direction. Also, the optical element 12 is fixed to a portion of a housing 15 constructed integrally with the substrate 11. The optical element 12 may be constructed independently of the substrate 11.

In the present embodiment, the two beams light-modulated and emitted from the multi-semiconductor laser 1 in conformity with image information are converted into substantially parallel beams by the collimator lens 2 and enter the cylindrical lens 4. Of the beams having entered the cylindrical lens 4, the beam in the main scanning cross section emerges in its intact state and passes through the aperture stop 3 (is partly intercepted). Also, in the sub scanning cross section, the beam converges and passes through the aperture stop 3 (is partly intercepted) and is imaged as a substantially linear image (a linear image long in the main scanning direction) on the deflecting surface 5c of the polygon mirror 5. The two beams reflected and deflected by the deflecting surface 5c of the polygon mirror 5 are imaged into a spot shape on the photosensitive drum surface 7 by the scanning optical means 6, and scan on the photosensitive drum surface 7 at equal speeds in the direction of arrow 7b (the main scanning direction) by the polygon mirror 5 being rotated in the direction of arrow 5b. Thereby two scanning lines are formed at a time on the photosensitive drum surface 7 which is a recording medium, and image recording is effected.

In this case, in order to adjust the timing of the canning start position on the photosensitive drum surface 7 before the photosensitive drum surface 7 is light-scanned, part of the two beams reflected and deflected by the polygon mirror 5 is condensed on the surface of the slit 13 by the synchronism detecting optical system 10, and thereafter is directed to the synchronism detecting device 9 through the optical element 12. By the use of a synchronizing signal (BD signal) obtained by detecting the output signal from the synchronism detecting device 9, the timing of the scanning start position of image recording onto the photosensitive drum surface 7 is adjusted for each BD beam.

While FIG. 1 shows a two-beam scanning optical apparatus using two light emitting points to simplify the illustration, three or more light emitting points may also be used.

The features of the present embodiment will now be described with reference to FIGS. 2A and 2B.

Figure 2A:
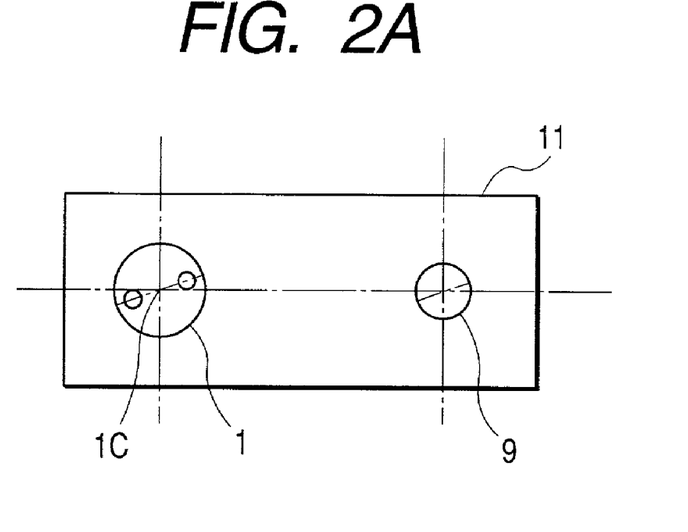
FIGS. 2A and 2B show a light source and a synchronism detecting device disposed on one and the same substrate in Embodiment 1 of the present invention.
Figure 2B:
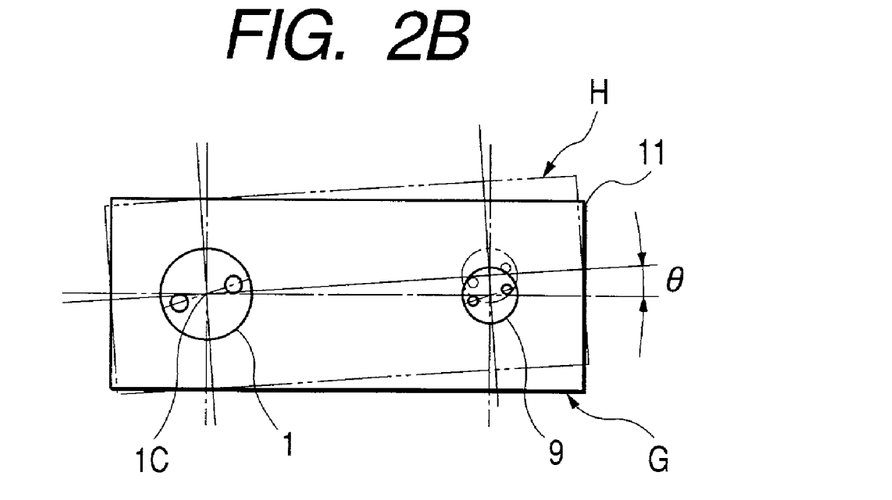

FIG. 2A shows the state before the adjustment immediately after the light source 1 and the synchronism detecting device 9 have been mounted on one and the same substrate 11, and FIG. 2B shows the state after the adjustment (after the substrate 11 has been rotated about the centroidal position of the two light emitting points 1A and 1B of the light source 1 or the vicinity thereof).

Part of the two beams emitted from the light source 1 is directed toward the synchronism detecting device 9 by the synchronism detecting optical system 10 through the intermediary of the polygon mirror 5, but power is given to the interior of the main scanning cross section of the synchronism detecting optical system 10 so that part of the beams deflected by the deflecting surface 5c of the polygon mirror 5 may be imaged on the surface of the slit 13 so as to become a substantially parallel beam, and in the sub scanning cross section, power adjusted to the condensing point of the beam near the deflecting surface 5c of the polygon mirror 5 is given.

Since as described above, power is given to the interior of the main scanning cross section so that the beam may be imaged on the surface of the slit 13, the beam becomes a beam of a shape long in the sub scanning direction on the surface of the slit 13.

The slit 13 is for limiting or controlling the incidence of the beams onto the synchronism detecting device 9 in effecting synchronism detection, and a synchronism detection signal (BD signal) is generated at a point of time whereat the beams intercepted by the slit 13 have passed through the slit 13 to the synchronism detecting device 9. By the use of this signal, the writing-out timing on the surface area to be scanned is determined in a synchronism detecting circuit (not shown). The beams having passed through the slit 13 are incident on the optical element 2 for directing the beams to the synchronism detecting device 9 immediately behind it.

This optical element 12 is formed of optical resin, and has independent focal lengths in the main scanning cross section and in the sub scanning cross section, respectively, as described above, and comprises a toric lens (toroidal lens) in which the condensing positions of the beams passed through the optical element 12 do not coincide with each other in the main scanning cross section and in the sub scanning cross section, and is made integral with the substrate 11 in a state in which it is incorporated in an optical element barrel fixed onto the substrate 11 and has been adjusted relative to the synchronism detecting device 9 on the substrate 11.

Also, the optical element 12, in the main scanning cross section, acts as the relay lens of the conjugate system of the slit 13 and the synchronism detecting device 9, and directs the beams on the surface of the slit 13 to the synchronism detecting device 9, and in the sub scanning cross section, has the function as a condensing lens for imaging the beams on the synchronism detecting device 9 because the beams pass as parallel beams through the slit 13.

Also, this optical element 12 has one or more aspherical surfaces having different curvatures in the main scanning cross section and in the sub scanning cross section, whereby it can be made as a highly accurate optical element which can cope with a shorter disposition. Further, it gives a degree of freedom to the entire system and is given an optimum shape in the main scanning and sub scanning cross sections and can therefore keep the condensing state good.

Also, the optical element 12 includes one or more diffracting surfaces and a refractive index distribution type optical blank of which the incidence and emergence surfaces form flat surfaces is used as this optical element 12, whereby an optical element of a flat surface construction becomes possible and thus, the structure for disposing it therein can be simplified.

When one surface of the optical element 12 as described above is made into a flat surface having an angle with respect to the optical axis, if for example, the synchronism detecting device has been disposed while being inclined with respect to the optical axis, the beams are obliquely incident on the synchronism detecting device and imaged thereon, and as compared with a case where the beams are incident perpendicularly thereto, the imaged spot shape will become worse. The synchronism detecting device is usually provided with protective cover glass and therefore, in order to prevent return light from this cover glass, the synchronism detecting device is sometimes inclined a little with respect to the optical axis, but a greater amount of inclination than necessary would promote the deterioration of the spot.

So, in the present embodiment, the optical element of the above-described flat surface construction is used as the optical element 12 to thereby correct and change the optical path, whereby the beams can be made to be incident on the synchronism detecting device 9 at a more appropriate angle of incidence.

In recent years, the use of optical resin has made it easy to form a diffracting surface, and if such diffracting surface is used in the synchronism detecting optical element 12, a lens of which the focal length is short and the curvature is liable to become sharp can be constructed of a substantially flat surface and if the optical element 12 is constructed by the use of a refractive index distribution type optical blank, the incidence and emergence surfaces thereof can be constructed of flat surfaces like the diffracting surface, and this leads to the structured merit that a hold-down mechanism and the disposition thereof can be made simple.

Also, the optical element 12 is formed by a surface having the condensing or diverging performance and a flat surface inclined with the main scanning direction as an axis, whereby when the substrate 11 and the synchronism detecting optical axis are not orthogonal to each other, the optical axis can be directed more in an orthogonal direction, and this can lead to a further improvement in accuracy.

To adjust the pitch interval between the scanning lines on the surface to be scanned, it is possible by changing the interval between a plurality of light emitting points, and specifically, a light source having a plurality of light emitting points can be rotated to thereby make the apparent interval in the sub scanning direction variable.

Usually, in the case of the light source having the plurality of light emitting elements, if the arrangement thereof is made such that they are arranged in a direction along the sub scanning direction, the interval therebetween will be determined and disposed on the surface to be scanned by the imaging magnification in the sub scanning direction comprising the incidence side incidence optical means and scanning optical means such as an fθ lens.

In the case of such an arrangement, however, for example, in the case of a light source of which the two light emitting points 1A and 1B have an interval of 100 µm therebetween, the scanning line interval at 600 dpi is 42.3 µm and therefore the imaging magnification thereof is 0.423 time.

This is a reduction magnification and thus, the fθ lens is disposed in a direction separate from the polygon mirror and therefore, the fθ lens requires a size similar to that of the scanning area thus resulting in the bulkiness of the entire apparatus, and this is not preferable.

An enlarging system is preferable for the smaller diameter of the fθ lens, but in that case, if the plurality of light emitting points are arranged along the sub scanning direction, the original interval between the light emitting points must be made small relative to the scanning interval, whereas few of commercially available semiconductor lasers cope with such a specification, and it would increase the cost to newly develop a semiconductor laser which can cope with such requirement.

The interval between the beams (scanning lines) on the surface to be scanned is too great as described above and therefore, a scanning optical apparatus of high definition uses a technique of disposing a light source in a state in which it has been rotated by a certain angle from a direction along the sub scanning direction.

Also, in the present embodiment, with the intermediate position (centroidal position) 1c of the two light emitting points 1A and 1B disposed on the substrate 11 as the center of rotation in accordance with the optical axis 4a, the light source is mounted on the substrate 11 in a state in which it has been rotated by an angle required from the imaging magnification in the sub scanning direction so that the scanning line pitch on the surface 7 to be scanned may be 42.3 µm if for necessary resolution, i.e., 600 dpi.

Now, actually, it happens that due to the machining errors or assembling errors of parts or the deviation of the condensing position occurring from aberrations, the light source is not disposed at the design position but the pitch interval deviates. To adjust this, a technique of rotating the light source mounted on the substrate bodily with the substrate and finely adjusting it.

In a construction like that of the present embodiment, namely, a construction in which the light source 1 and the synchronism detecting device 9 are integral with each other on one and the same substrate 11, the synchronism detecting device 9 is also rotated by the same angle in the same direction as the light source.

When now the center of the multi-semiconductor laser 1 which is the light source is chosen as the center of rotation and the laser 1 is rotated with the direction of the optical axis as the axis, the light emitting points change in the interval therebetween in the sub scanning direction along the rotation, but if this state continues, there is the possibility that as shown in FIG. 2B, the state of the beams changes from (G) to (H) and the beams deviate from the synchronism detecting device 9 and correct synchronism detection becomes impossible.

Figure 3A:
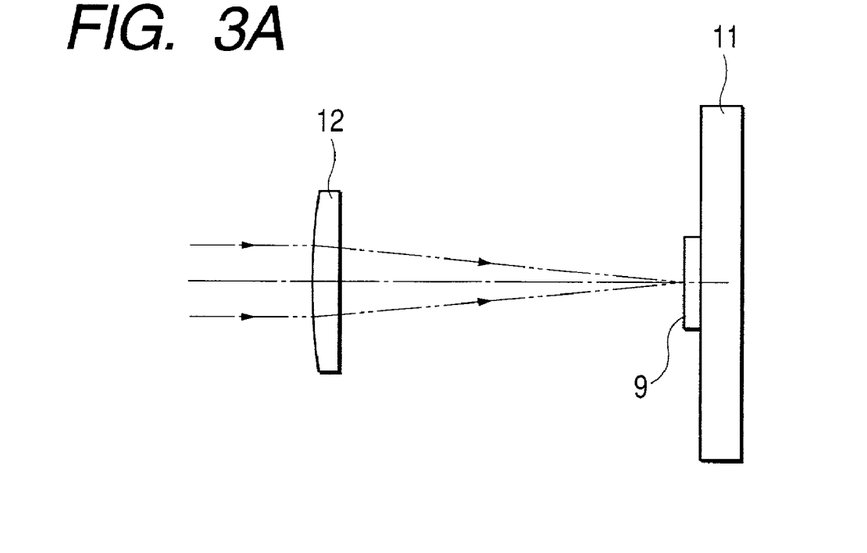
FIGS. 3A and 3B are cross-sectional views of the essential portions of an optical system forming the main portion of synchronism detecting means in Embodiment 1 of the present invention.
Figure 3B:
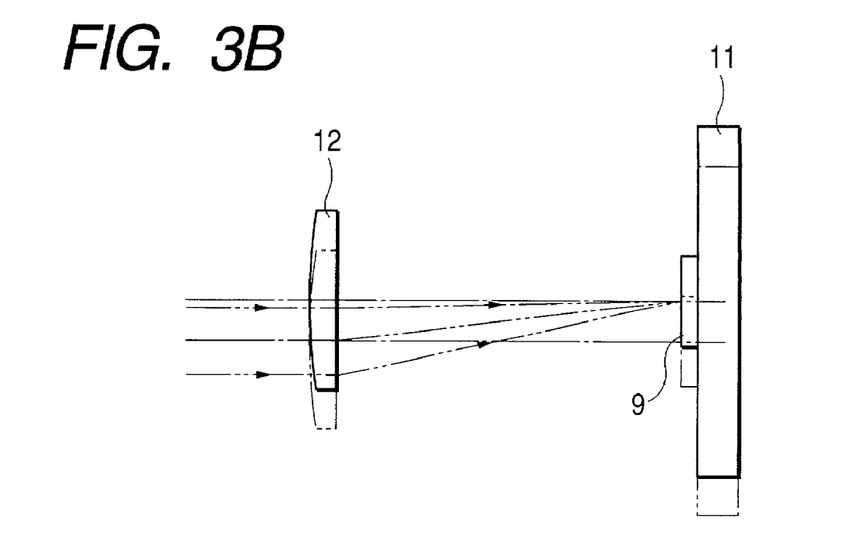

According to the present embodiment, however, as shown in FIGS. 3A and 3B, the beams are substantially parallel beams relative to the interior of the sub scanning cross section and therefore, even if the substrate 11 is rotated and therewith, the optical element 12 is rotated, substantially parallel beams are unchangingly incident on the optical element 12, and the beams can be condensed on the optical axis of the optical element 12, i.e., on the synchronism detecting device 9. Even in the case of substantially parallel beams having an angle, this also holds true if the synchronism detecting device 9 is disposed at the condensing point of the beams.

As described above, in the present embodiment, even if the substrate 11 is rotated, the beams do not deviate from the synchronism detecting device 9 and there is no change in the quantity of light by the rotation and therefore, stable synchronism detection can be effected.

Further, in the present embodiment when the focal length of the optical element 12 in the sub scanning direction is defined as f, and the distance from the slit 13 to the synchronism detecting device 9 is defined as W, and the effective diameter of the optical element 12 is defined as D, and the distance on the substrate 11 from the center of rotation of the substrate 11 to the synchronism detecting device 9 is defined as d, and the overall magnification of the beams emitted from the light source means 1 in the sub scanning direction until they arrive at the synchronism detecting device 9 is defined as m, and the angle of rotation of the substrate 11 is defined as θ, one or more of the conditions that $$0.6f < W < 0.9f \quad (1)$$

$$2d \cdot \tan \theta (1-m) < D \quad (2)$$

are satisfied.

Conditional expression (1), when the beams for synchronism detection (BD beams) are made to be incident as convergent beams on the slit 13 in the sub scanning cross section by the synchronism detecting optical system 10, shows a preferable range in the detection accuracy thereof. If the lower limit value of conditional expression (1) is exceeded, the synchronisms detecting device 9 will become too proximite to the optical element 12 and will be affected by the movement of the beams during rotation and the beams will deviate and it will become impossible to correctly detect the beams to be detected, and this is not good. Also, if the upper limit value of conditional expression (1) is exceeded, the state of incidence of the beams onto the synchronism detecting device 9 will become bad and specifically, this will become a factor of such a phenomenon as that the beams travel toward such a position as exceeds the effective range of the synchronism detecting device 9 or the positional accuracy of the synchronism detecting optical system 10 becomes severe, and this is not good.

Conditional expression (2) is for preventing the beams from deviating from the optical element 12 before the synchronism detecting device when the substrate 11 is rotated. The focal length, the angle of rotation, etc. of the optical element 12 set by this conditional expression (2) are satisfied, whereby always stable synchronism detection can be effected. If conditional expression (2) is departed from, the beams may exceed the diameter of the optical element 12, and this is not good.

In the present embodiment, each element is set so as to satisfy at least conditional expression (2) of the above-mentioned conditional expressions (1) and (2).

That is, in the present embodiment, the sub scanning magnification m in the system concerned in synchronism detection was adjusted to 0.42 time, the effective diameter D of the optical element was adjusted to φ4 mm, the distance d from the center of rotation of the substrate 11 to the synchronism detecting device was adjusted to 30 mm, and the angle of rotation θ was adjusted to 2.2. At this time, the value of the left side calculated from conditional expression (2) is 1.34 mm, which satisfies conditional expression (2). In the present embodiment, the angle of rotation θ is adjusted within a range up to maximum 6.5, whereby good synchronism detection becomes possible, and this is sufficient as the amount of adjustment.

While in the present embodiment, the rotation of the substrate 11 is effected in a plane perpendicular to the optical axis 4a, the substrate 11 may be rotated in a plane containing the synchronism detecting surface if the detecting surface of the synchronism detecting device 9 is not a surface parallel to the substrate 11 or is not placed parallel to the substrate 11.

(Embodiment 2)

Figure 4:
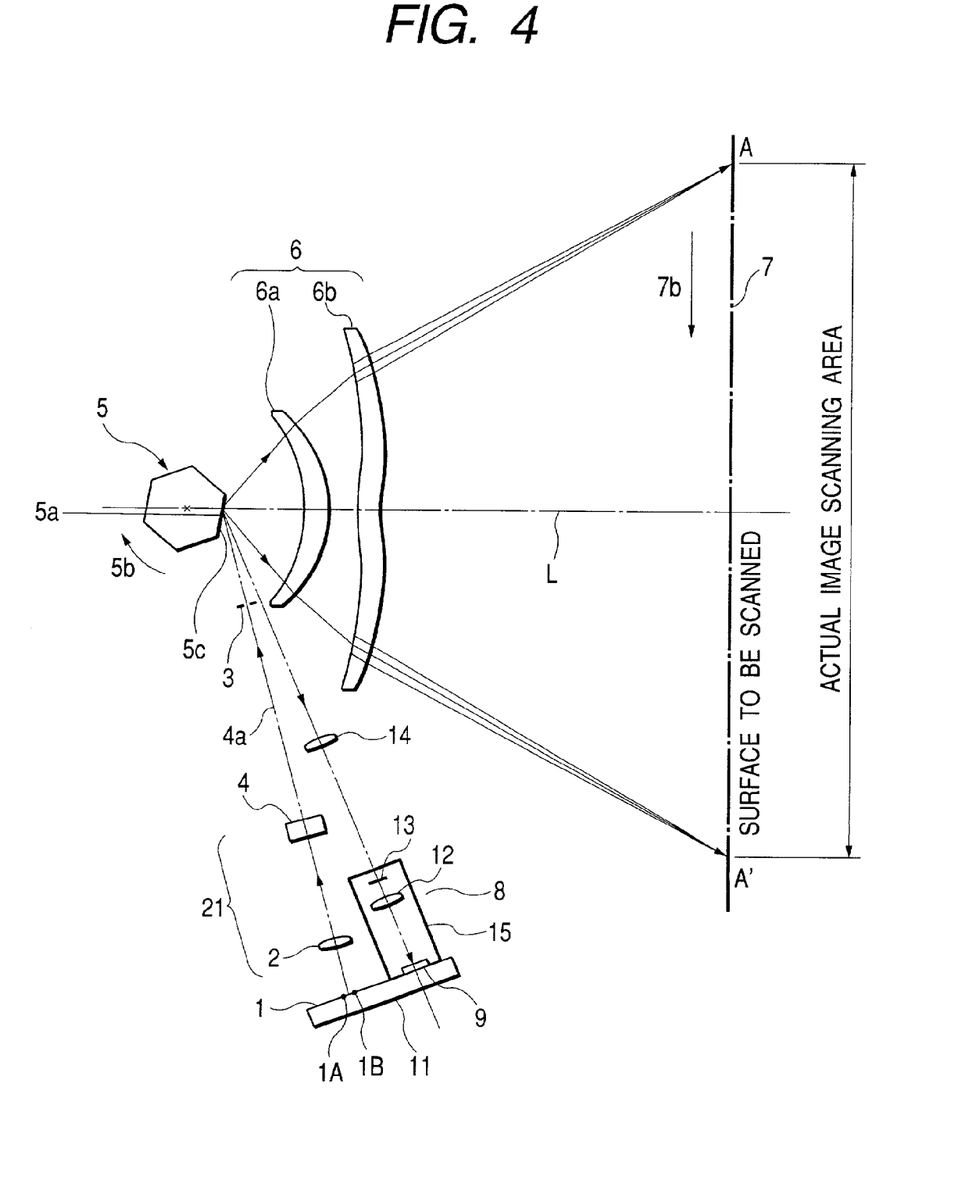
FIG. 4 is a main scanning cross-sectional view of Embodiment 2 of the present invention.

FIG. 4 is a cross-sectional view of the essential portions of Embodiment 2 of the present invention is the main scanning direction (main scanning cross-sectional view). In FIG. 4, the same elements as the elements shown in FIG. 1 are given the same reference characters.

The difference of this embodiment form the afore-described Embodiment 1 is that the beams for synchronism detection (BD beams) are both condensed on the surface of the slit 13 in the main scanning cross section and the sub scanning cross section by a synchronism detecting optical system 14, and in the other points, the construction and optical action of the present embodiment are substantially similar to those of Embodiment 1, whereby a similar effect is obtained.

That is, in the present embodiment, incidence optical means similar to that in the aforedescribed Embodiment 1 is disposed, and the beams converged in the sub scanning direction near the deflecting surface 5c of the polygon mirror 5 by the cylindrical lens 4 are relayed in the synchronism detecting optical path by the synchronism detecting optical system 14, and are condensed at a time on the surface of the slit 13 in the main scanning and sub scanning cross sections. This is for preventing the surface inclination of the deflecting surface 5c of the polygon mirror 5 from affecting synchronism detection, and the deflecting surface 5c of the polygon mirror 5 and the slit 13 are set in the conjugate relation of a surface inclination correcting system.

That is, the present embodiment is of a construction in which the power of the synchronism detecting optical system 14, in the main scanning cross section, is that of a condensing lens for the slit 13, and in the sub scanning cross section, is that of relay lens for making the deflecting surface 5c and the slit 13 conjugate with each other.

In the present embodiment, the beams once converged on the surface of the slit 13 are directed to the synchronism detecting device 9 by the optical element 12, and in this embodiment, each element is set so as to satisfy at least conditional expression (1) of the aforementioned conditional expressions (1) and (2), whereby good synchronism detection is effected.

That is, in the present embodiment, when a single lens having a focal length f of 18 mm is used as the optical element 12, and the distance W from the slit 13 to the synchronism detecting device 9 is set to 14.7 mm, the beam diameter on the detecting surface is 0.3ϕ, and the distance W in conditional expression (1) is 0.82 f, and even when the light is rotated by 5 degrees bodily with the substrate and adjusted thereby, movement of the order of 3 mm is only required relative to the synchronism detecting surface and therefore, the beams do not deviate from the detecting surface, and stable synchronism detection can be effected.

Each of the above-described embodiments is designed to satisfy one of the above-mentioned conditional expressions (1) and (2), but if each of them is designed to satisfy both of the two conditional expressions, more stable synchronism detection can of course be effected.

While there have so far been shown embodiment using a semiconductor laser (light source) having a plurality of light emitting points, adjustment is possible by a similar construction even when a plurality of semiconductor lasers are juxtaposed on the substrate for use. In this, it will be seen that a light emitting point is substituted for a semiconductor laser, whereby a similar construction is easily possible.

When a plurality of semiconductor lasers are used, there is a technique of using a combining optical system for combining optical paths by the use of a mirror, or arranging a plurality of semiconductor lasers on a substrate, and causing them to emit lights at different angles toward the deflecting surface, but in any case, if rotation is used when adjusting the pitch interval in the sub scanning direction, the adjustment becomes easily possible by the structure of the present invention.

Also, while in the present embodiment, the light source means is comprised of a multi-semiconductor laser having a plurality of light emitting points, the present invention can be applied like Embodiment 1 even if the light source means is comprised of a semiconductor laser (light source) having a single light emitting point. In this case, the substrate on which the light source and the synchronism detecting device are disposed can be rotated with the position of the light source or the vicinity thereof as the center of rotation.

Also, in the present invention, without the use of the collimator lens 2 and the cylindrical lens 4 or the like, the beams from the light source means 1 may be directly directed to the polygon mirror 5 through the aperture stop 3.

Also, while in the present embodiment, the scanning optical means is comprised of two lenses, this is not restrictive, but the scanning optical means may be comprised, for example, of a single lens or three or more lenses.

(Image Forming Apparatus)

Figure 5:
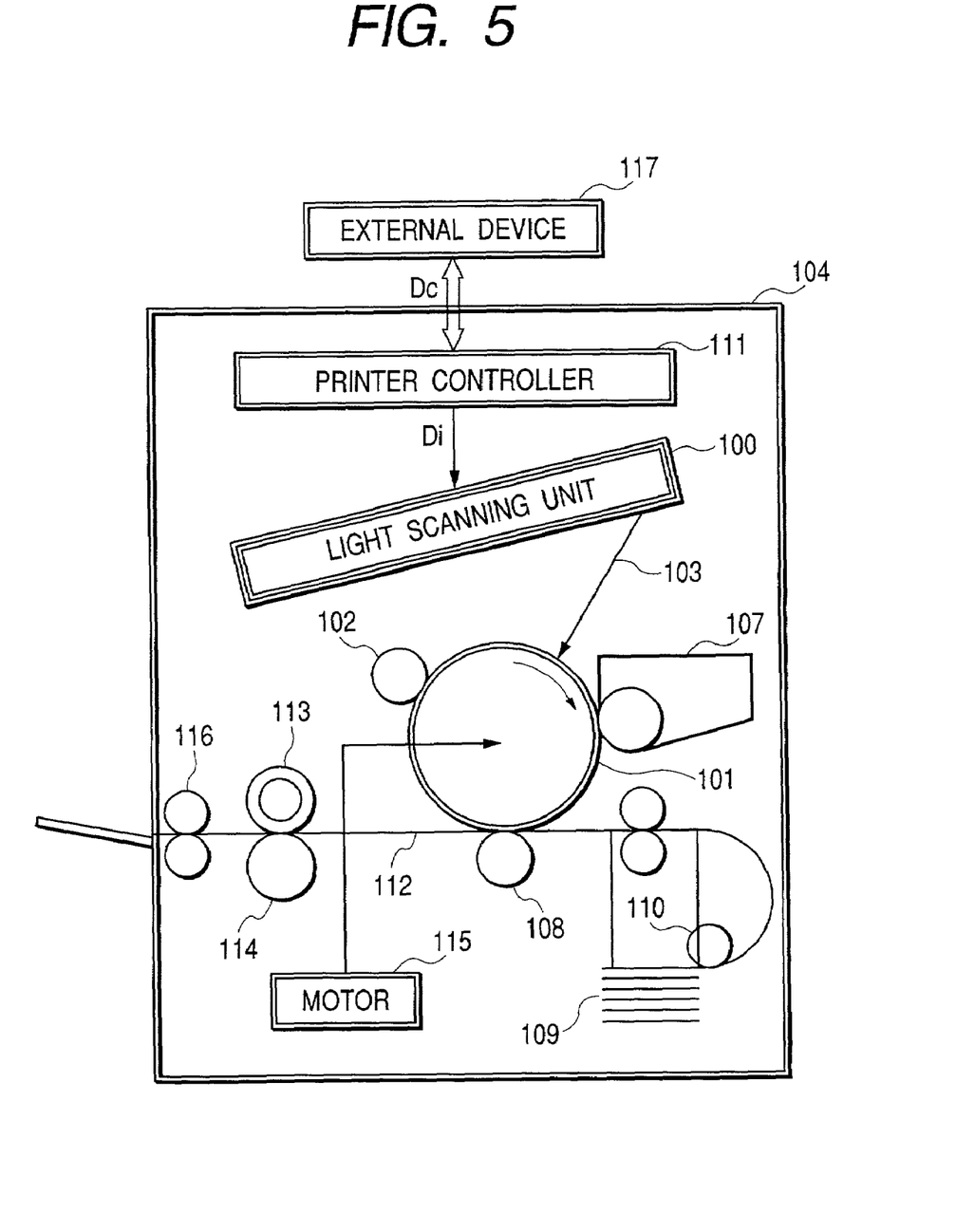
FIG. 5 is a sub scanning cross-sectional view showing an example of the construction of an image forming apparatus (electrophotographic printer) using the scanning optical apparatus of the present invention.

FIG. 5 is a cross-sectional view of essential portions in the sub scanning cross section showing an embodiment of an image forming apparatus (electrophotographic printer) using the scanning optical apparatus of the aforedescribed Embodiment 1 or 2. In FIG. 5, the reference numeral 104 designates the image forming apparatus. Code data Dc is inputted from an external device 117 such as a personal computer to this image forming apparatus 104. This code data Dc is converted into image data (dot data) Di by a printer controller 111 in the apparatus. This image data Di is inputted to a light scanning unit 100 having the construction shown in each of Embodiments 1 and 2. A light beam (beam) 103 modulated in conformity with the image data Di is emitted from the light scanning unit (scanning optical apparatus) 100, and the photosensitive surface of a photosensitive drum 101 is scanned in the main scanning direction by the light beam 103.

The photosensitive drum 101 which is an electrostatic latent image bearing body (photosensitive body) is clockwisely driven by a motor 115. With this rotation, the photosensitive surface of the photosensitive drum 101 moves relative to the light beam 103 in the sub scanning direction orthogonal to the main scanning direction. Above the photosensitive drum 101, a charging roller 102 for uniformly charging the surface of the photosensitive drum 101 is provided so as to contact with the surface of the photosensitive drum. The light beam 103 scanned by the light scanning unit 100 is applied to the surface of the photosensitive drum 101 charged by the charging roller 102.

As previously described the light beam 103 is modulated on the basis of the image data Di, and this light beam 103 is applied to the surface of the photosensitive drum 101 to thereby form an electrostatic latent image thereon. This electrostatic latent image is developed as a toner image by a developing device 107 disposed so as to abut against the photosensitive drum 101 further downstream of the applied position of the light beam 103 in the rotational cross section of the photosensitive drum 101.

The toner image developed by the developing device 107 is transferred onto a sheet 112 which is a transferring material by a transferring roller (transferring device) 108 disposed below the photosensitive drum 101 so as to be opposed to the photosensitive drum 101. The sheet 112 is contained in a sheet cassette 109 forward (at the right as viewed in FIG. 5) of the photosensitive drum 101, and can be manually fed. A sheet feeding roller 110 is disposed at one end portions of the sheet cassette 109 and feeds the sheets 112 in the sheet cassette 109 one by one toward a conveying path.

The sheet 112 to which the unfixed toner image has been transferred in the manner described above is further conveyed to a fixing device rearward (at the left as viewed in FIG. 5) of the photosensitive drum 101. The fixing device is comprised of a fixing roller 113 having a fixing heater (not shown) therein and a pressure roller 114 disposed so as to be brought into pressure contact with the fixing roller 113, and heats the sheet 112 conveyed thereto from the transferring portion while pressurizing it by the pressure contact portion between the fixing roller 113 and the pressure roller 114 to thereby fix the unfixed toner image on the sheet 112. Further, sheet discharging rollers 116 are disposed rearwardly of the fixing roller 113 and discharge the fixed sheet 112 out of the image forming apparatus.

Although not shown in FIG. 5, the printer controller 111 effects not only the aforedescribed data conversion, but also the control of various portions including the motor 115 in the image forming apparatus and a polygon motor or the like in the light scanning unit 100.

(Effects of the Invention)

According to the present invention, there can be achieved a scanning optical apparatus in which as previously described, a light source and a synchronism detecting device are disposed on one and the same substrate and yet the optical positional relation therebetween can be kept good and at least one of conditional expressions is satisfied, whereby highly accurate synchronism detection becomes possible by simple alignment, and which can sufficiently cope as a highly accurate synchronism detecting device in forming a higher-density and high-performance scanning optical apparatus and image forming apparatus in the future, and an image forming apparatus using the same.

Further, there can be achieved a scanning optical apparatus in which complicated or delicate adjustment is not required and therefore the number of steps during assembly is greatly reduced, whereby which is excellent for the curtailment of cost, and an image forming apparatus using the same.

What is claimed is:

1. A scanning optical apparatus comprising: light source means, having a plurality of light emitting points, for emitting a plurality of beams; deflecting means for deflecting the plurality of beams; incidence optical means through which the plurality of beams emitted from said light source means are directed to said deflecting means;
   scanning optical means for directing the plurality of beams deflected by said deflecting means onto a surface to be scanned; and
   synchronism detecting means for detecting a part of the plurality of beams incident on said surface to be scanned,
   wherein a timing of a scanning starting position of the plurality of beams incident on the surface to be scanned is adjusted by using a synchronized signal obtained by said synchronism detecting means;
   wherein said synchronism detecting means comprises a synchronism detecting device;
   wherein a light source including one or more of the plurality of light emitting points of said light source means is provided on a substrate, said synchronism detecting means further comprising an optical element disposed on a light incidence side of said synchronism detecting device, and
   wherein said optical element is designed to be rotated in synchronism with said substrate when said substrate is rotated.

2. A scanning optical apparatus according to claim 1, wherein a slit for limiting the incident beams is disposed on said light incidence side of said synchronism detecting device, and when a focal length of said optical element in a sub scanning direction is defined as f, and a distance from said slit to said synchronism detecting device is defined as W, and an effective diameter of said optical element is defined as D, and a distance on the substrate from a center of rotation of said substrate to said synchronism detecting device is defined as d, and a composite magnification of the beams emitted from said light source means in the sub scanning direction until the beams arrive at said synchronism detecting device is defined as m, and an angle of rotation when said substrate is rotated in a surface perpendicular to an optical axis direction of said incidence optical means is defined as θ, one or more of conditions that $0.6f < W < 0.9f$ $2d \cdot \tan \theta (1-m) < D$ are satisfied.

3. A scanning optical apparatus according to claim 2, wherein the plurality of beams incident on said optical element are substantially parallel beams in a sub scanning cross section.

4. A scanning optical apparatus according to claim 1, wherein said substrate is designed to be rotatable about a centroidal position of the light emitting points of said light source or the vicinity thereof.

5. A scanning optical apparatus according to claim 1, wherein a slit for limiting the incident beams is disposed on said light incident side of said synchronism detecting device, and said synchronism detecting means is for directing part of the plurality of beams incident on said surface to be scanned and causes the beams deflected by said deflecting means to be condensed on said slit in the main scanning cross section, and makes them into substantially parallel beams in the sub scanning cross section.

6. A scanning optical apparatus according to claim 1, wherein a slit for limiting the incident beams is disposed on said light incidence side of said synchronism detecting device, and said synchronism detecting means is for directing part of the plurality of beams incident on said surface to be scanned and for causing the beams deflected by said deflecting means to be condensed on said slit in a main scanning cross section and in a sub scanning cross section.

7. A scanning optical apparatus according to claim 1, wherein said optical element is fixed to a portion of a housing constructed integrally with said substrate.

8. A scanning optical apparatus according to claim 1, wherein said optical element has independent focal lengths in a main scanning cross section and in a sub scanning cross sections, respectively, and condensed positions of the beams passed through said optical element do not coincide with each other in the main scanning cross section and in the sub scanning cross section.

9. A scanning optical apparatus according to claim 1, wherein said optical element has independent focal lengths in a main scanning cross section and in a sub scanning cross section, respectively, and include one or more diffracting surfaces.

10. A scanning optical apparatus according to claim 1, wherein said optical element has independent focal lengths in a main scanning cross section and in a sub scanning cross section, respectively, and has one or more aspherical surfaces having different curvatures in the main scanning cross section and in the sub scanning cross section.

11. A scanning optical apparatus according to claim 1, wherein said optical element includes a refractive index distribution type optical material in which incidence and emergence surfaces form flat surfaces.

12. A scanning optical apparatus according to claim 1, wherein said optical element has a surface having condensing or diverging performance, and a flat surface inclined with a main scanning direction as an axis.

13. A scanning optical apparatus according to claim 1, wherein a slit for limiting the incident beams is disposed at or near condensed positions of the beams passed through said synchronism detecting means in a main scanning cross section, said slit defining a rectangular slit opening which is longer in a sub scanning direction, and said slit is designed to rotate in synchronism with said substrate when said substrate is rotated.

14. A scanning optical apparatus according to claim 1, wherein said synchronism detecting optical device is of structure independent of said substrate.

15. An image forming apparatus comprising a scanning optical apparatus according to any one of claims 1 to 14, a photosensitive body disposed on said surface to be scanned, a developing device for developing an electrostatic latent image formed on photosensitive body by the light beams scanned by said scanning optical apparatus as a toner image, a transferring device for transferring material, and a fixing device for fixing the transferred toner image on a transferring material.

16. An image forming apparatus comprising a scanning optical apparatus according to any one of claims 1 to 14, and a printer controller for converting code data inputted thereto from an external device into an image signal, and inputting the image signal to said scanning optical apparatus.

17. An adjusting method of a scanning optical apparatus, comprising steps of:

directing a plurality of beams, emitted from light source means having a plurality of light emitting points, to deflecting means through incidence optical means;

directing the plurality of beams deflecting by said deflecting means onto a surface to be scanned by scanning optical means; and adjusting a timing of a scanning starting position of the plurality of beams incident on the surface to be scanned by using a synchronized signal obtained by synchronism detecting means for detecting a part of the plurality of beams incident on the surface to be scanned, said synchronism detecting means comprising a synchronism detecting device having an optical element provided on a light incident side thereof;

wherein a light source including one or more of the plurality of light emitting points of said light source means, and said synchronism detecting device are provided on the same substrate, and said optical element rotates in synchronism with said substrate, and wherein a scanning interval of the plurality of beams, incident on said surface to be scanned, in a sub-scanning direction is adjusted by rotating said substrate in a surface perpendicular to an optical axis direction of said incidence optical means.

* * * * *

UNITED STATES PATENT AND TRADEMARK OFFICE
CERTIFICATE OF CORRECTION

| | |
|---|---|
| PATENT NO. | : 7,149,009 B2 |
| APPLICATION NO. | : 10/137348 |
| DATED | : December 12, 2006 |
| INVENTOR(S) | : Seiichiro Mori |

It is certified that error appears in the above-identified patent and that said Letters Patent is hereby corrected as shown below:

ON COVER PAGE [57] ABSTRACT:

Line 4, "constituting the synchronism detecting device" should be deleted.

COLUMN 1:

Line 35, "long in" should read --along--.

COLUMN 2:

Line 52, "this lead" should read --this leads--.

COLUMN 3:

Line 48, "tot he" should read --to the--; and
Line 50, "define" should read --defined--.

COLUMN 4:

Line 50, "long in" should read --along--.

COLUMN 6:

Line 20, "long in" should read --along--; and
Line 38, "incoincidence" should read --coincidence--.

COLUMN 7:

Line 11, "whereby" should read --thereby--; and
Line 52, "long in" should read --along--.

COLUMN 8:

Line 40, "canning" should read --scanning--.

UNITED STATES PATENT AND TRADEMARK OFFICE
CERTIFICATE OF CORRECTION

| | |
|---|---|
| PATENT NO. | : 7,149,009 B2 |
| APPLICATION NO. | : 10/137348 |
| DATED | : December 12, 2006 |
| INVENTOR(S) | : Seiichiro Mori |

It is certified that error appears in the above-identified patent and that said Letters Patent is hereby corrected as shown below:

COLUMN 10:

Line 50, "few of" should read --few--.

COLUMN 12:

Line 7, "synchronisms" should read --synchronism--;
Line 8, "proximite" should read --proximate--; and
Line 59, "form" should read --from--.

COLUMN 13:

Line 18, "of relay" should read --of a relay--.

COLUMN 14:

Line 57, "portions" should read --portion--.

COLUMN 15:

Line 28, "whereby" should be deleted.

COLUMN 16:

Line 44, "sections," should read --section,--; and
Line 51, "include" should read --includes--.

UNITED STATES PATENT AND TRADEMARK OFFICE
CERTIFICATE OF CORRECTION

PATENT NO. : 7,149,009 B2
APPLICATION NO. : 10/137348
DATED : December 12, 2006
INVENTOR(S) : Seiichiro Mori

It is certified that error appears in the above-identified patent and that said Letters Patent is hereby corrected as shown below:

<u>COLUMN 17</u>:

Line 16, "photosensitive" should read --said photosensitive--; and
Line 18, "for transferring material," should read --for transferring the developed toner image to a transferring material,--.

Signed and Sealed this

Fourteenth Day of July, 2009

JOHN DOLL
*Acting Director of the United States Patent and Trademark Office*